(12) United States Patent
Ruehle et al.

(10) Patent No.: US 6,766,964 B1
(45) Date of Patent: Jul. 27, 2004

(54) FUEL INJECTOR

(75) Inventors: Wolfgang Ruehle, Ditzingen (DE); Hubert Stier, Asperg (DE); Matthias Boee, Ludwigsburg (DE); Guenther Hohl, Stuttgart (DE); Norbert Keim, Loechgau (DE)

(73) Assignee: Robert Bosch GmbH, Stuttgart (DE)

(*) Notice: Subject to any disclaimer, the term of this patent is extended or adjusted under 35 U.S.C. 154(b) by 51 days.

(21) Appl. No.: 09/869,489

(22) PCT Filed: Oct. 27, 2000

(86) PCT No.: PCT/DE00/03799
§ 371 (c)(1),
(2), (4) Date: Sep. 27, 2001

(87) PCT Pub. No.: WO01/34968
PCT Pub. Date: May 17, 2001

(30) Foreign Application Priority Data

Oct. 28, 1999 (DE) .......................... 199 52 057

(51) Int. Cl.[7] .............................. B05B 1/08; B05B 1/30; F02M 39/00
(52) U.S. Cl. .................. 239/102.1; 239/88; 239/533.3; 239/585.1; 239/585.5
(58) Field of Search .......................... 239/102.1, 102.2, 239/88, 89, 91, 95, 533.2, 533.3, 585.1, 585.3, 585.4, 585.5; 251/129.15, 129.21, 127

(56) References Cited

U.S. PATENT DOCUMENTS

| | | | |
|---|---|---|---|
| 4,022,166 A | 5/1977 | Bart | |
| 4,817,387 A | * 4/1989 | Lashbrook | ............ 60/611 |
| 5,115,982 A | * 5/1992 | Mesenich | ........... 239/585.3 |
| 5,727,639 A | * 3/1998 | Jeter | ............ 173/132 |
| 5,821,671 A | 10/1998 | Trzmiel | |

FOREIGN PATENT DOCUMENTS

| DE | 17 51 543 | 8/1970 |
|---|---|---|
| DE | 195 00 706 | 7/1996 |
| DE | 195 34 445 | 3/1997 |

* cited by examiner

Primary Examiner—Davis Hwu
(74) Attorney, Agent, or Firm—Kenyon & Kenyon

(57) ABSTRACT

A fuel injector, in particular for fuel injection systems of internal combustion engines, has a valve closing body which can be operated by an actuator by a valve needle and which cooperates with a valve seat face to form a sealing seat. Swiveling toggle elements are situated between the actuator and the valve needle, so that the actuator acts on first lever arms of the swiveling toggle elements, and second lever arms are mechanically linked to the valve needle.

25 Claims, 1 Drawing Sheet

FUEL INJECTOR

FIELD OF THE INVENTION

The present invention relates to a fuel injector.

BACKGROUND INFORMATION

German Published Patent Application No. 195 34 445 discusses a fuel injector having a piezoelectric actuator for operation of a valve needle connected to a valve closing body. The valve closing body cooperates with a sealing seat.

It is believed that a disadvantage of this injector is the relatively short stroke travel of the piezoelectric actuator, which is composed of several piezoelectric layers arranged in a stack, for the relatively large lifting forces.

Furthermore, it is believed that such a fuel injector may be implemented only as either an inward opening valve or an outward opening valve. Various requirements of such valves, however, may also necessitate outward or inward opening with a design that is otherwise the same. To this end, the working direction of the actuator must be reversed. In German Published Patent Application No. 195 00 706, this is apparently accomplished by a hydraulic reversal of direction. The hydraulic device for reversal of direction, which may be difficult to implement in the design, and the greater space that may be required by such a hydraulic device are believed to be disadvantages. Other disadvantages may include hydraulic fluid leakage losses and subsequent negative effects on the functioning and lifetime of the hydraulic device and thus the entire fuel injector.

SUMMARY OF THE INVENTION

The fuel injector according to an exemplary embodiment of the present invention, is believed to have the advantage that the working direction is reversed by purely mechanical toggle elements. Therefore, it is believed that the exemplary embodiment of the present invention may be less susceptible to malfunction, may be advantageous to manufacture and may require relatively little space.

The reversal of direction achieved by the toggle elements can be used in a variety of ways and is not limited to piezoelectric actuators.

Furthermore, it is believed that by slightly redesigning the toggle elements, the relatively short stroke produced by the piezoelectric actuator can be geared up by lengthening the lever arm, and the stroke acting on the valve needle can be increased.

It is believed that the fuel injector according to the exemplary embodiment of the present invention is also characterized by a high precision in the opening and closing times and thus also in the metered quantity of fuel, because there is no delay in the reversal of direction or in gearing up the stroke.

DETAILED DESCRIPTION

Figure 1:
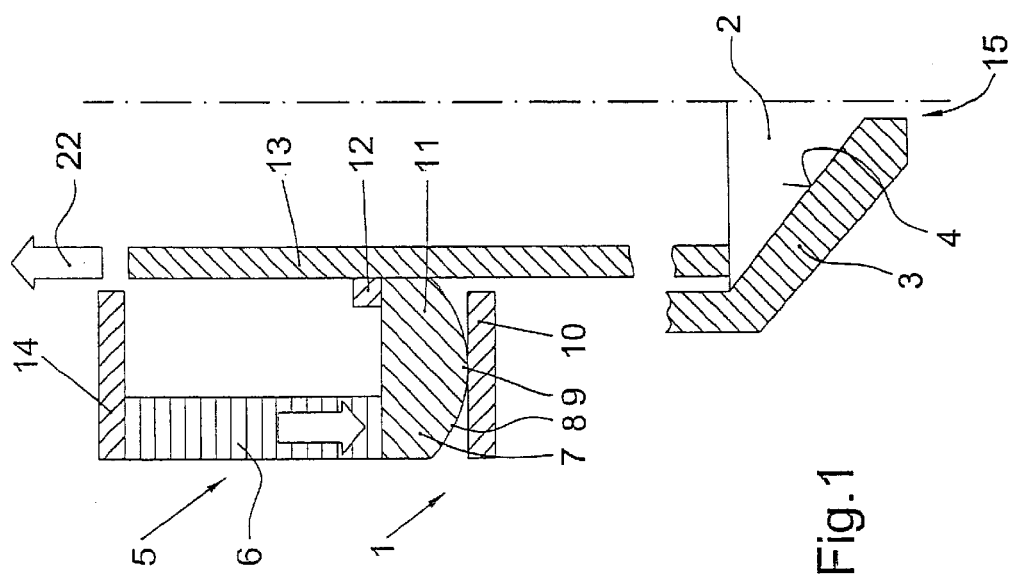
FIG. 1 shows an axial schematic section through an exemplary embodiment of a fuel injector according to the present invention.

FIG. 1 shows an axial sectional diagram through a first exemplary embodiment of a fuel injector 1 according to the present invention. This fuel injector is believed to be especially suitable for direct injection of fuel, in particular gasoline, into the combustion chamber of an internal combustion engine, which may be an internal combustion engine having fuel mixture compression and spark ignition. The fuel injector which is shown in FIG. 1 is an inward opening fuel injector 1.

Fuel injector 1 has a valve closing body 2 which cooperates with a valve seat face 4 on a valve seat body 3 to form a sealing seat.

An actuator 5 is composed of disk-shaped elements 6, for example, and surrounds a tubular valve needle 13 in a ring. Disk-shaped elements 6 of actuator 5 are made of a piezoelectric or magnetostrictive material and can be glued together. At the end, actuator 5 is secured on a first lever arm 7 by swiveling toggle elements 8.

Swiveling toggle elements 8 are arranged in a ring around valve needle 13, with the ring being divided into several segments.

On their side facing away from actuator 5, swiveling toggle elements 8 each have a curved contact face 9 which rests on a first abutment 10 and has a symmetrical design in FIG. 1.

With a second lever arm 11, swiveling toggle elements 8 act on a driving pin 12 mounted on valve needle 13. On the end opposite the toggle elements, actuator 5 is attached to a second abutment 14, such as, for example, by gluing.

As soon as an electric voltage is applied to actuator 5, disk-shaped elements 6 expand and thus exert a force on first lever arms 7 of swiveling toggle elements 8 due to the resulting stroke. Due to the curved shape of contact faces 9, second lever arms 11 of swiveling toggle elements 8 move in the opposite direction and thus also move valve needle 13 in the same direction by means of driving pin 12, so that valve closing body 2 which is connected to valve needle 13 is lifted up from valve seat face 4. In this way, inward opening fuel injector 1 is opened and fuel is sprayed through at least one spray opening 15. The direction of movement of valve needle 13 is illustrated by arrow 22.

Figure 2:
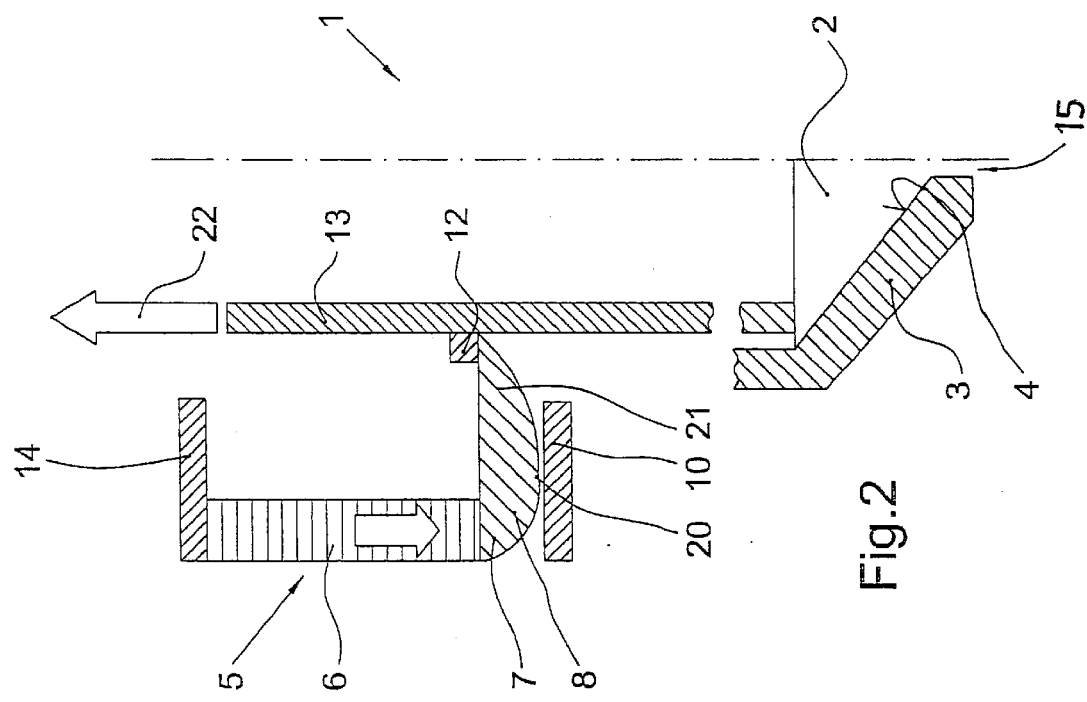
FIG. 2 shows an axial schematic section through another exemplary embodiment of a fuel injector according to the present invention.

FIG. 2 shows an axial section through a second exemplary embodiment of a fuel injector 1 according to the present invention. Elements that have already been described are labeled with the same reference notation to facilitate a correlation. The description will not be repeated to this extent.

While fuel injector 1 shown in FIG. 1 has swiveling toggle elements 8 with a symmetrically curved contact face 9, contact face 20 in the exemplary embodiment in FIG. 2 is asymmetrical.

In the case of an actuator 5 having the same design in comparison with FIG. 1, the same number of disk-shaped elements 6 and the same electric voltage, this results in a larger stroke of valve needle 13 via driving pin 12; thus, the stroke is geared up here.

The present invention is not limited to the exemplary embodiments given here and in particular it can also be applied to other actuators, such as, for example, electromagnetic actuators, as well as other valve designs.

What is claimed is:

1. A fuel injector for a fuel injection system of an internal combustion engine, the fuel injector comprising:
   an actuator;
   a valve needle; and
   a valve closing body operable by the actuator via the valve needle, the valve closing body cooperating with a valve seat face to form a sealing seat; wherein:

at least one swiveling toggle element, having a first
lever arm and a second lever arm, is situated between
the actuator and the valve needle;

the actuator acts on the first lever arm of the at least one
swiveling toggle element; and the second lever arm of the at least one swiveling toggle
element is at least one of mechanically linked and
operatively connected to the valve needle; and an actuation direction of the actuator and a movement
direction of the valve needle are arranged in parallel
opposite directions.

2. The fuel injector of claim 1, wherein each of the at least one swiveling toggle element is supported on a first abutment.

3. The fuel injector of claim 2, wherein each of the at least one swiveling toggle element includes a curved contact face on which it rests on the first abutment.

4. The fuel injector of claim 1, wherein a curved contact face of each of the at least one swiveling toggle element has a symmetrical curvature.

5. The fuel injector of claim 1, wherein a curved contact face of each of the at least one swiveling toggle element has an asymmetrical curvature.

6. The fuel injector of claim 1, wherein each of the at least one swiveling toggle element acts on a driving pin provided on the valve needle, the valve needle being axially arranged.

7. The fuel injector of claim 1, wherein each of the at least one swiveling toggle element includes asymmetrical lever arms, and a stroke induced by the actuator is geared up.

8. The fuel injector of claim 1, wherein the actuator includes at least one of a piezoelectric actuator and a magnetostrictive actuator which is correspondingly composed of one of piezoelectric disk-shaped elements and magnetostrictive disk-shaped elements arranged in a stack.

9. The fuel injector of claim 1, wherein the at least one swiveling toggle element includes a plurality of swiveling toggle elements arranged in a ring.

10. The fuel injector of claim 1, wherein the actuator is arranged between the at least one swiveling toggle element and an abutment to reverse a direction of a force exerted on the at least one swiveling toggle element.

11. A fuel injector for a fuel injection system of an internal combustion engine, the fuel injector comprising:
an actuator;
a valve needle; and
a valve closing body operable by the actuator via the valve needle, the valve closing body cooperating with a valve seat face to form a sealing seat;
wherein at least one swiveling toggle element, having a first lever arm and a second lever arm, is situated between the actuator and the valve needle;
wherein the actuator acts on the first lever arm of the at least one swiveling toggle element;
wherein the second lever arm of the at least one swiveling toggle element is at least one of mechanically linked and operatively connected to the valve needle;
wherein each of the at least one swiveling toggle element is supported on a first abutment; and
wherein each of the at least one swiveling toggle element includes a curved contact face on which it rests on the first abutment.

12. The fuel injector of claim 11, wherein a curved contact face of each of the at least one swiveling toggle element has one of a symmetrical curvature and an asymmetrical curvature.

13. The fuel injector of claim 11, wherein each of the at least one swiveling toggle element acts on a driving pin provided on the valve needle, the valve needle being axially arranged.

14. The fuel injector of claim 11, wherein each of the at least one swiveling toggle element includes asymmetrical lever arms, and a stroke induced by the actuator is geared up.

15. The fuel injector of claim 11, wherein the actuator includes at least one of a piezoelectric actuator and a magnetostrictive actuator which is correspondingly composed of one of piezoelectric disk-shaped elements and magnetostrictive disk-shaped elements arranged in a stack.

16. A fuel injector for a fuel injection system of an internal combustion engine, the fuel injector comprising:
an actuator;
a valve needle; and
a valve closing body operable by the actuator via the valve needle, the valve closing body cooperating with a valve seat face to form a sealing seat;
wherein at least one swiveling toggle element, having a first lever arm and a second lever arm, is situated between the actuator and the valve needle;
wherein the actuator acts on the first lever arm of the at least one swiveling toggle element;
wherein the second lever arm of the at least one swiveling toggle element is at least one of mechanically linked and operatively connected to the valve needle; and
wherein the at least one swiveling toggle element includes a plurality of swiveling toggle elements for forming one of ring segments and a ring part.

17. The fuel injector of claim 16, wherein a curved contact face of each of the at least one swiveling toggle element has one of a symmetrical curvature and an asymmetrical curvature.

18. The fuel injector of claim 16, wherein each of the at least one swiveling toggle element acts on a driving pin provided on the valve needle, the valve needle being axially arranged.

19. The fuel injector of claim 16, wherein each of the at least one swiveling toggle element includes asymmetrical lever arms, and a stroke induced by the actuator is geared up.

20. The fuel injector of claim 16, wherein the actuator includes at least one of a piezoelectric actuator and a magnetostrictive actuator which is correspondingly composed of one of piezoelectric disk-shaped elements and magnetostrictive disk-shaped elements arranged in a stack.

21. A fuel injector for a fuel injection system of an internal combustion engine, the fuel injector comprising:
an actuator;
a valve needle; and
a valve closing body operable by the actuator via the valve needle, the valve closing body cooperating with a valve seat face to form a sealing seat;
wherein at least one swiveling toggle element, having a first lever arm and a second lever arm, is situated between the actuator and the valve needle;
wherein the actuator acts on the first lever arm of the at least one swiveling toggle element;
wherein the second lever arm of the at least one swiveling toggle element is at least one of mechanically linked and operatively connected to the valve needle;
wherein each of the at least one swiveling toggle element is supported on a first abutment; and
wherein a direction of a force exerted on the at least one swiveling toggle element is reversed due to an arrangement of the actuator between the at least one swiveling toggle element and a second abutment.

22. The fuel injector of claim 21, wherein a curved contact face of each of the at least one swiveling toggle element has one of a symmetrical curvature and an asymmetrical curvature.

23. The fuel injector of claim 21, wherein each of the at least one swiveling toggle element acts on a driving pin provided on the valve needle, the valve needle being axially arranged.

24. The fuel injector of claim 21, wherein each of the at least one swiveling toggle element includes asymmetrical lever arms, and a stroke induced by the actuator is geared up.

25. The fuel injector of claim 21, wherein the actuator includes at least one of a piezoelectric actuator and a magnetostrictive actuator which is correspondingly composed of one of piezoelectric disk-shaped elements and magnetostrictive disk-shaped elements arranged in a stack.

* * * * *

UNITED STATES PATENT AND TRADEMARK OFFICE
CERTIFICATE OF CORRECTION

PATENT NO. : 6,766,964 B1 Page 1 of 1
DATED : July 27, 2004
INVENTOR(S) : Franz Rieger et al.

It is certified that error appears in the above-identified patent and that said Letters Patent is hereby corrected as shown below:

<u>Column 3,</u>
Line 5, delete "and".

Signed and Sealed this

Twenty-first Day of June, 2005

JON W. DUDAS
*Director of the United States Patent and Trademark Office*